(12) United States Patent
Moehle et al.

(10) Patent No.: US 12,211,055 B1
(45) Date of Patent: Jan. 28, 2025

(54) SYSTEMS AND METHODS FOR CONTROLLING A DYNAMIC SYSTEM AS LINEARLY CONSTRAINED SEPARABLE OPTIMIZATION

(71) Applicant: BlackRock, Inc., New York, NY (US)

(72) Inventors: Nicholas Moehle, Palo Alto, CA (US); Jack Gindi, New York, NY (US); Stephen Boyd, Palo Alto, CA (US); Mykel J. Kochenderfer, Palo Alto, CA (US)

(73) Assignee: BlackRock Finance, Inc., New York, NY (US)

( * ) Notice: Subject to any disclaimer, the term of this patent is extended or adjusted under 35 U.S.C. 154(b) by 211 days.

(21) Appl. No.: 17/688,352

(22) Filed: Mar. 7, 2022

Related U.S. Application Data (60) Provisional application No. 63/157,249, filed on Mar. 5, 2021.

(51) Int. Cl.
| | | |
|---|---|---|
| *G06Q 30/0202* | (2023.01) |
| *G06Q 10/04* | (2023.01) |
| *G06Q 40/04* | (2012.01) |
| *G06Q 40/06* | (2012.01) |

(52) U.S. Cl.
CPC ......... *G06Q 30/0202* (2013.01); *G06Q 10/04* (2013.01); *G06Q 40/04* (2013.01); *G06Q 40/06* (2013.01)

(58) Field of Classification Search
CPC .... G06Q 30/0202; G06Q 10/04; G06Q 40/04; G06Q 40/06
USPC .......................................... 705/7.31
See application file for complete search history.

(56) References Cited

U.S. PATENT DOCUMENTS

| | | | | |
|---|---|---|---|---|
| 2012/0008632 A1* | 1/2012 | Liu | ....... | H04L 47/828 370/395.5 |
| 2014/0081888 A1* | 3/2014 | Chung | ........ | G06Q 40/06 705/36 R |
| 2015/0331833 A1* | 11/2015 | Lustig | ........ | G06F 17/11 708/274 |
| 2021/0022034 A1* | 1/2021 | Zachrison | ....... | H04W 28/0942 |

* cited by examiner

*Primary Examiner* — Francis Z. Santiago Merced
(74) *Attorney, Agent, or Firm* — Haynes and Boone, LLP (57) ABSTRACT

Embodiments described herein provide a mechanism to solve the portfolio construction problem with nonconvex penalties and constraints that are separate across assets. This problem may be viewed as a special case of the separable-affine problem, i.e., the problem of minimizing a separable objective function with affine equality constraints.

20 Claims, 8 Drawing Sheets

SYSTEMS AND METHODS FOR CONTROLLING A DYNAMIC SYSTEM AS LINEARLY CONSTRAINED SEPARABLE OPTIMIZATION

CROSS REFERENCES

The present application is a nonprovisional of and claims priority under 35 U.S.C. 119 to U.S. provisional application No. 63/157,249, filed Mar. 5, 2021, which is hereby expressly incorporated by reference herein in its entirety.

TECHNICAL FIELD

The present disclosure relates generally to optimal control in a dynamic system, and more specifically, to controlling a dynamic system as a linearly constrained separable optimization.

BACKGROUND

Dynamic systems often entail a dynamic control process that receives an input of control variables for the system to generate a group of dynamic outcomes. The control variables may be determined by formulating and solving an optimization problem that maximizes an objective to optimize a performance metric of the dynamic system.

For example, in a data network, such as a home wireless local area network (WLAN), a cellular network, and/or the like, different user devices operating different applications may compete for network resources in a local area network. The different applications may create different data traffic such as video streaming traffic, web browsing traffic, email traffic, and/or the like. A user utility (e.g., latency, throughput, transmission error rate, etc.) of the network resource may be a function of the resource that is allocated to the user. A network controller may aim at allocating resources to each user such that the aggregated user utilities can be maximized. However, network utility maximization may also be subject to a non-convex utility, or constraint, rendering the optimization problem.

For another example, an investment process is a dynamically evolving process based on various control events, such as making an investment decision, constructing an investment portfolio, executing a trade order, and/or the like, is often guided by a portfolio manager, or implemented as an automated process, or some combination. The portfolio construction can be formulated as a mean-variance portfolio optimization problem, such as a quadratic objective and linear equality constraints. In some situations, the optimization problem can be extended by including position limits or a long-only constraint, investment restrictions, risk or leverage limits, trading costs, and/or the like, which may adversely affect the convexity of the optimization problem. For example, the asset holdings may be in integral numbers of shares, or the realized capital gains or the number of securities may be penalized. These constraints may cause a nonconvex portfolio construction problem, which remains challenging to solve in an efficient manner.

Therefore, there is a need to find an efficient mechanism to solve the nonconvex optimization problem for dynamic systems.

BRIEF DESCRIPTION OF THE DRAWINGS

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Portfolio construction with various investment constraints that appear in a form of nonconvex optimization problems have long been challenging. For example, a mean-variance portfolio optimization with separable holding and trading costs can often be used to decide how much to invest in each of n assets. The decision may be represented by $h \in R^n$, where $h_i$ is the fraction of the portfolio value to be invested in asset i. Then the solution h is determined by solving an optimization problem:

$$\text{maximize} \alpha^T h - \gamma_{risk} h^T V h - \gamma_{trd} \phi_{trd}(h - h_{init}) - \gamma_{hld} \phi_{hld}(h)$$
$$\text{subject to} \eta_{lb} \leq 1^T h \leq \eta_{ub}. \quad (1)$$

The objective of (1) trades off expected return, risk, trading costs, and holding costs (with positive tradeoff parameters $\gamma_{risk}$, $\gamma_{trd}$, and $\gamma_{hld}$). The vector $\alpha \in R^n$ is the expected return forecast for the n assets, meaning $\alpha^T h$ is the expected portfolio return. The matrix $V \in S_{++}^n$ is the asset return covariance matrix, meaning $h^T V h$ is the variance of the portfolio return. Assuming V has a form:

$$V = X\Sigma X^T + D, \quad (2)$$

where $X \in R^{n \times k}$ is the factor exposure matrix, $\Sigma \in S_{++}^k$ is the symmetric positive definite factor covariance matrix, and $D \in S_{++}^n$ is the diagonal matrix of idiosyncratic variances with $D_{ii} > 0$.

The constraint species that the fraction of the account value that is invested (given by $1^T h$) is between the scalars $\eta_{lb}$ and $\eta_{ub}$. For example, setting $\eta_{lb}=0.98$ and $\eta_{ub}=0.99$, means that between 98% and 99% of the account value must be invested after the trade is carried out, leaving 1-2% in cash.

The trading cost $\phi_{trd}(h-h_{init})$ is the cost of trading from the initial portfolio $h_{init}$ to h. Similarly, $\phi_{hld}(h)$ is the cost of holding portfolio h. Although the trading cost function may not be convex, but they are separable per asset, i.e., $$\phi_{trd}(u) = \sum_{i=1}^{n} \phi_{trd,i}(u_i), \quad \phi_{hld}(h) = \sum_{i=1}^{n} \phi_{hld,i}(h_i).$$

In one embodiment, the trading cost function $\phi_{hld}(h)$ may apply a position limit on each asset, e.g., $$\phi_{hld}(h) = \begin{cases} 0 & \text{if } h_{lb} \le h \le h_{ub} \\ \infty & \text{otherwise.} \end{cases} \quad (3)$$

where $h_{lb} \in R^n$ and $h_{ub} \in R^n$. For example, if $h_{lb}=0$, the position limit encodes a long-only constraint.

In one embodiment, the trading cost function $\phi_{hld}(h)$ may impose a minimum holding size, e.g., for each asset, the trader either does not hold it or holds at least $h_{min}$ of it. In this case, the trading cost function is expressed as:

$$\phi_{hld,i}(h_i) = \begin{cases} 0 & \text{if } |h_i| \le h_i^{min} \text{ or } h_i = 0 \\ \infty & \text{otherwise.} \end{cases}$$

In one embodiment, the trading cost function $\phi_{hld}(h)$ may indicate the per-security holding cost, e.g., by directly penalizing the number of securities held in the account by taking:

$$\phi_{hld,i}(h_i) = \begin{cases} 0 & \text{if } h_i = 0 \\ c_{hld} & \text{otherwise,} \end{cases} \quad (4)$$

where $c_{hld}$ is the cost of trading a single asset. The trading cost for the portfolio is $\phi_{trd}(h) = c_{hld}$ card(h). Penalizing this value models the account overhead associated with maintaining a large portfolio with many assets.

In one embodiment, the trading cost function $\phi_{hld}(h)$ may lead to an integer share constraint, e.g., the portfolio is restricted to hold an integer number of shares of each security, e.g., $h_i/p_i \in Z$, where $p_i$ is the per-share price of security i. In this sense, the trading cost function $\phi_{hld}(h)$ is given as:

$$\phi_{hld,i}(h) = \begin{cases} 0 & \text{if } h_i/p_i \in Z \\ \infty & \text{otherwise.} \end{cases}$$

Thus, because the trading cost functions may not be convex, optimization problem (1) can be difficult to solve. Traditional systems may reformulate (1) as a mixed-integer convex problem, typically a mixed-integer quadratic program or a mixed-integer second-order cone program, both of which can be solved using standard methods. In practice, these methods often solve problem instances quickly, but sometimes the runtime can be extremely long, incurring significant computational burden to the system.

Embodiments described herein provide a mechanism to solve the portfolio construction problem with nonconvex penalties and constraints that are separate across assets. This problem may be viewed as a special case of the separable-affine problem, i.e., the problem of minimizing a separable objective function with affine equality constraints.

Specifically, a heuristic algorithm is proposed for solving problems in this class based on the alternating direction method of multipliers (ADMM). This method solves problems to moderate accuracy quickly, even when the separable functions are very complicated. This speed is obtained because each separable function can be interfaced through its proximal operator, which only involves a few arithmetic operations. This separable-affine form makes it efficient to compute a lower bound on the problem value using the convex relaxation obtained by replacing the separable functions by their convex envelopes.

In some embodiments, a fast algorithm may be adopted for constructing these convex envelopes for piecewise quadratic functions, which often appear in portfolio optimization.

It is noted that although embodiments described herein are directed to determining an optimal investment policy by solving a separable optimization problem, the optimization methods described herein are applicable to generating an optimal control policy for various types of time-varying dynamic systems, such as but not limited to a mechanical system, an electronic circuit system, a computer security system, and/or the like. For example, an electrical power system may constantly consume electric power for daily use, while preserving a portion of generated power for different applications (analogous to investment). System dynamics may be described by the power consumption variable (e.g., analogous to $h_t$), and an objective that maximizes the power utility. The power consumption may then be implemented by determining an optimal consumption policy determined in a similar formulation as described below in FIGS. 1-5.

For another example, the optimization problem (1) can be analogous to a network utility maximization problem, where the variable vector h is analogous to the network resource (e.g., bandwidth, computational resource, etc.) allocation vector over a group of different application traffic, e.g., web browsing traffic, video streaming traffic, voice over IP traffic, point-to-point traffic, file transfer protocol traffic, and/or the like. The objective of (1) is analogous to maximizing aggregated network utility (e.g., latency performance, throughput, etc.) based on the resource allocation vector minus an application running cost (analogous to the trading cost) and a power consumption cost (analogous to the holding costs). The network resource allocation may then be implemented at a gateway of a network, by determining an optimal allocation h determined in a similar formulation as described below in FIGS. 1-5.

Figure 1:
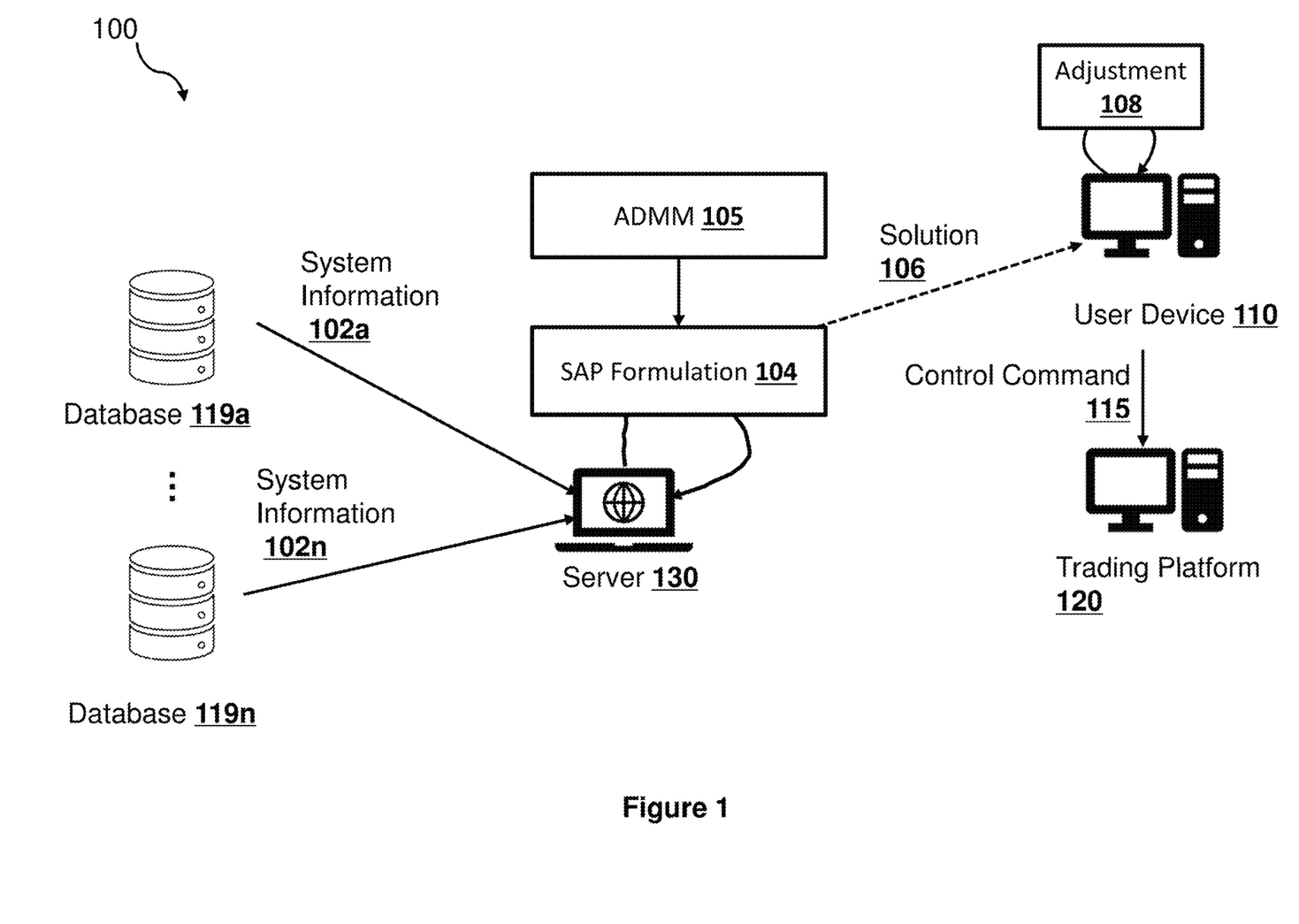
FIG. 1 provides a block diagram illustrating example data flows among entities for determining an optimal control policy of an investment portfolio, according to embodiments described herein.

FIG. 1 provides a block diagram 100 illustrating example data flows among entities for determining an optimal control policy of an investment portfolio, according to embodiments described herein. Diagram 100 shows a server 130, various databases 119a-n, a user device 110, an electronic trading platform 120, and/or the like interacting with each other, e.g., via a communication network. In diagram 100, the number of databases 119a-n are shown for illustrative purposes, while any number of databases may be communicative with the server 130.

In one embodiment, the server 130 may receive or access system information 102a-n, e.g., relating to an investment portfolio from the various databases 119a-n. The investment information 102a-n may be associated with an investment process comprising investment into a number of assets which produces a dynamic (time-varying) process involving portfolio allocation. Such a dynamic investment process may be controlled by the holding variable h of each asset. The system information 102a-n may indicate features of the investment process of an investor, such as the annuity payment amount, the annual income, asset class information, and/or the like.

In one embodiment, the server 130 may receive inputs in the form of the investment information 102a-n and then determine a control policy, e.g., based on the optimization problem (1). For example, a separable-affine problem (SAP) formulation module 104 may transform the optimization problem (1) into an SAP problem with a new objective and relevant variables. For example, an SAP problem may take a form as:

$$\text{minimize } \sum_{i=1}^{n} f_i(x_i) \quad (5)$$
$$\text{subject to } Ax = b,$$

with variable $x \in R^n$. The parameters are $A \in R^{m \times n}$ and $b \in R^m$, as well as the separable function $f_i: R \to R \cup \{\infty\}$. The objective is separable as $$f(x) = \sum_{i=1}^{n} f_i(x_i).$$

In one embodiment, the SAP problem (5) may correspond to a network utility maximization problem that determines a set of optimal resource variables $x \in R^n$ to be allocated to $\eta$ users. Each user device may correspond to a separable utility function $f_i: R \to R \cup \{\infty\}$, which may represent the latency, throughput, transmission error rate, packet loss, and/or the like that the user device experiences when a certain amount of resource (e.g., bandwidth, etc.) is allocated to the user device. For example, $f_i$ may be a sigmoidal function of adaptive real-time traffic in fourth generation Long Term Evolution (LTE) networks, when users are assigned to resource blocks and a transmission may use multiple resource blocks scheduled over frequency and time. In this case, the affine constraint parameters $A \in R^{m \times n}$ corresponds to a routing matrix of the network and $b \in R^m$ denotes a vector of maximum throughput on each transmission link. As a sigmoidal function is non-convex, the resulting SAP problem (5) is thus non-convex and remains challenging to determine the optimum.

Thus, the SAP formulation module 104 adopts two variables, e.g., the cash fraction $c=1-1^T h$ and the factor exposure vector $\gamma=CX(h-h_b)$, where C is a Cholesky factor of $\Sigma$, e.g., $\Sigma=CC^T$, to transform the portfolio construction problem to be:

$$\text{maximize } \alpha^T h - \gamma_{risk}(y^T y + h^T Dh) - \gamma_{trd}\phi_{trd}(h - h_{init}) - \gamma_{hld}\phi_{hld}(h) \quad (7)$$
$$\text{subject to } y = CX(h - h_b)$$
$$c + 1^T h = 1$$
$$1 - \eta_{ub} \le c \le 1 - \eta_{lb}.$$

The variables are h, c and y, and this is an SAP problem by setting a vector variable $x=(h, c, y) \in R^{n+m+1}$ and other affine constraint parameters as:

$$A = \begin{bmatrix} CX & 0 & -I \\ 1^T & 1 & 0 \end{bmatrix}, \quad b = \begin{bmatrix} CXh_b \\ 1 \end{bmatrix}$$

$$f_i(h_i) = \alpha_i h_i - \gamma_{risk} D_{ii} h_i^2 + \gamma_{trd}\phi_{trd,i}(h - h_{init}) + \gamma_{hld}\phi_{hld,i}(h)$$

for i=1, . . . , n. The component off corresponding to c is:

$$f_{n+1}(c) = \begin{cases} 0 & \text{if } 1 - \eta_{ub} \le c \le 1 - \eta_{lb} \\ \infty & \text{otherwise.} \end{cases}$$

The component off corresponding toy is defined by $f_i(\gamma_i) = \gamma_i^2$, for i=n+2, . . . , n+m+1.

Figure 3:
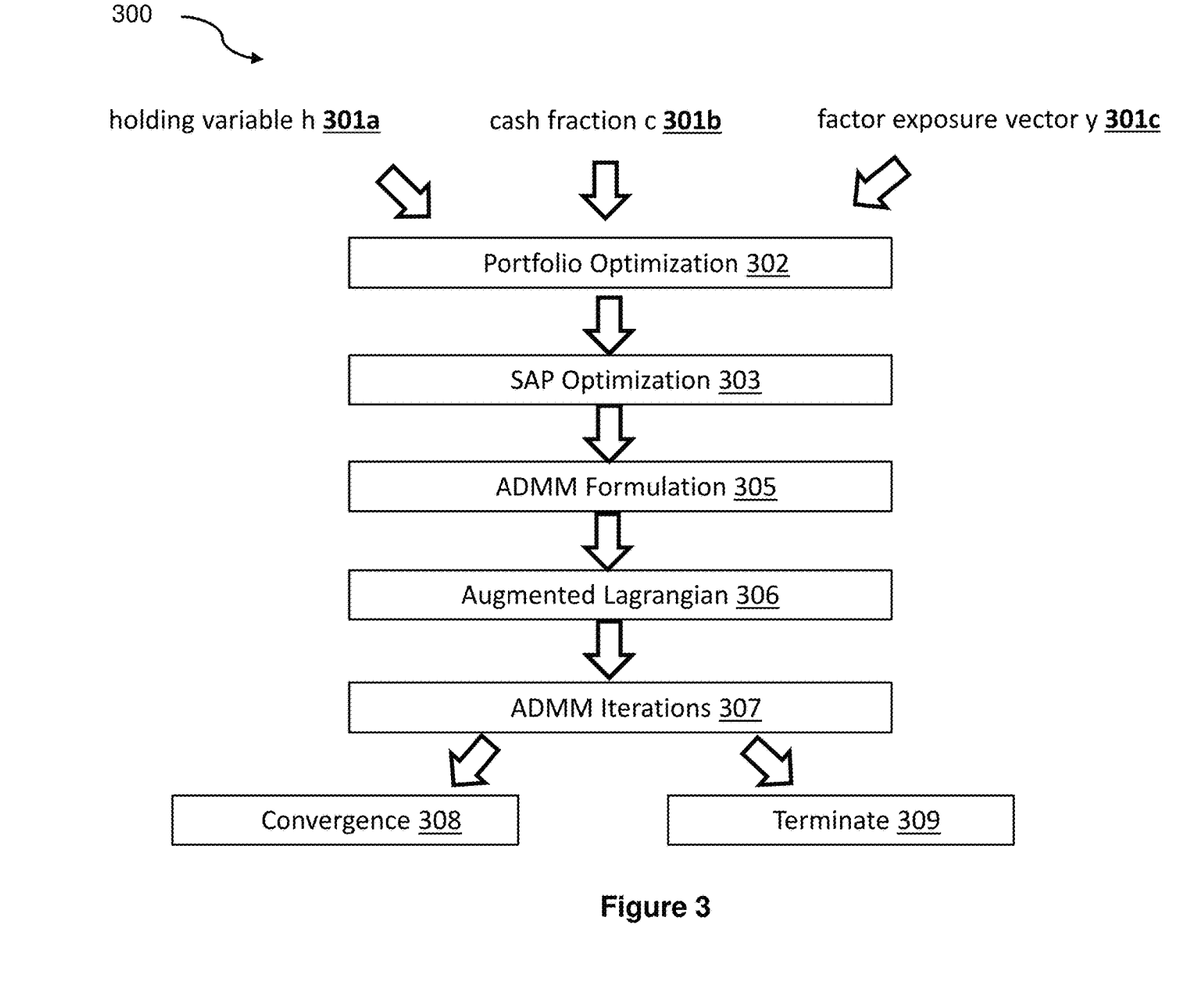
FIG. 3 is a simplified diagram showing transforming an investment optimization problem into an alternating direction method of multipliers (ADMM) iterative method, according to an embodiment described herein.
Figure 5:
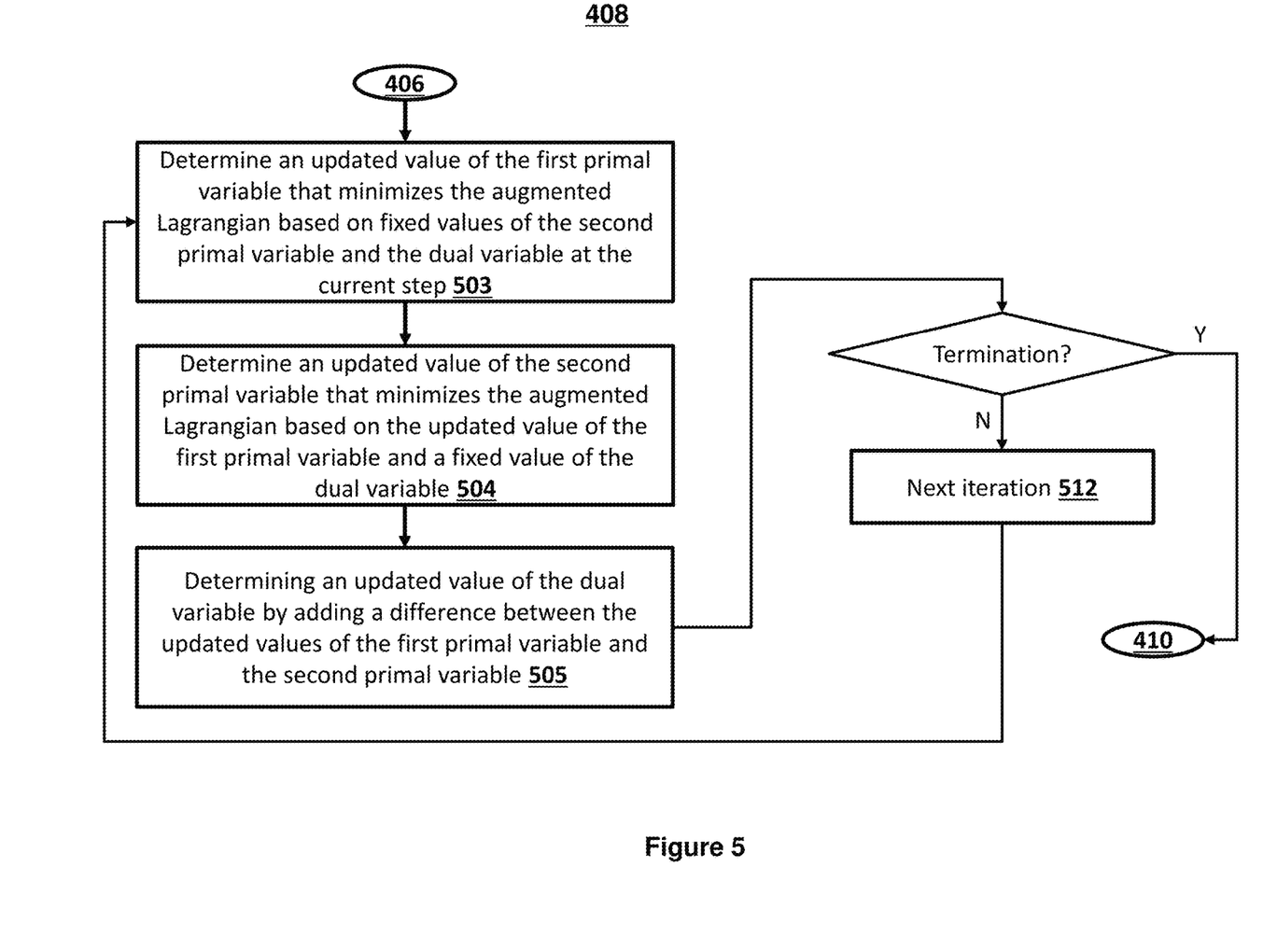
FIG. 5 is an example logic flow diagram illustrating an exemplary process for an iterative ADMM procedure for determining the control solution, according to an embodiment described herein.

An ADMM module 105 may then implement an iterative ADMM procedure to provide a solution to the SAP problem (7) from module 104, as further described in FIGS. 3 and 5.

In one embodiment, the SAP formulation module 104, upon implementing the ADMM procedure with ADMM module 105, may generate an optimal control solution 106 to send to a user device 110. For example, a user operating the user device 110 may make investment strategy adjustment 108 to an investment portfolio based on the optimal control solution 106, e.g., by setting the holding per asset. The user device 110 may further generate a control command (e.g., trade order 115 reflecting the strategy adjustment 108) to an electronic trading platform 120. For example, the trade order 115 may include an investment amount for a particular asset class determined by the optimal control solution 106.

In one embodiment, in the context of network utility maximization, the SAP formulation module 104 and the ADMM module 105 may be implemented at a gateway that hosts the server 130. The gateway may then use the determined solution 106 to allocate resources (e.g., bandwidth) to incoming traffic for different user device(s) 110 in the network.

Figure 2:
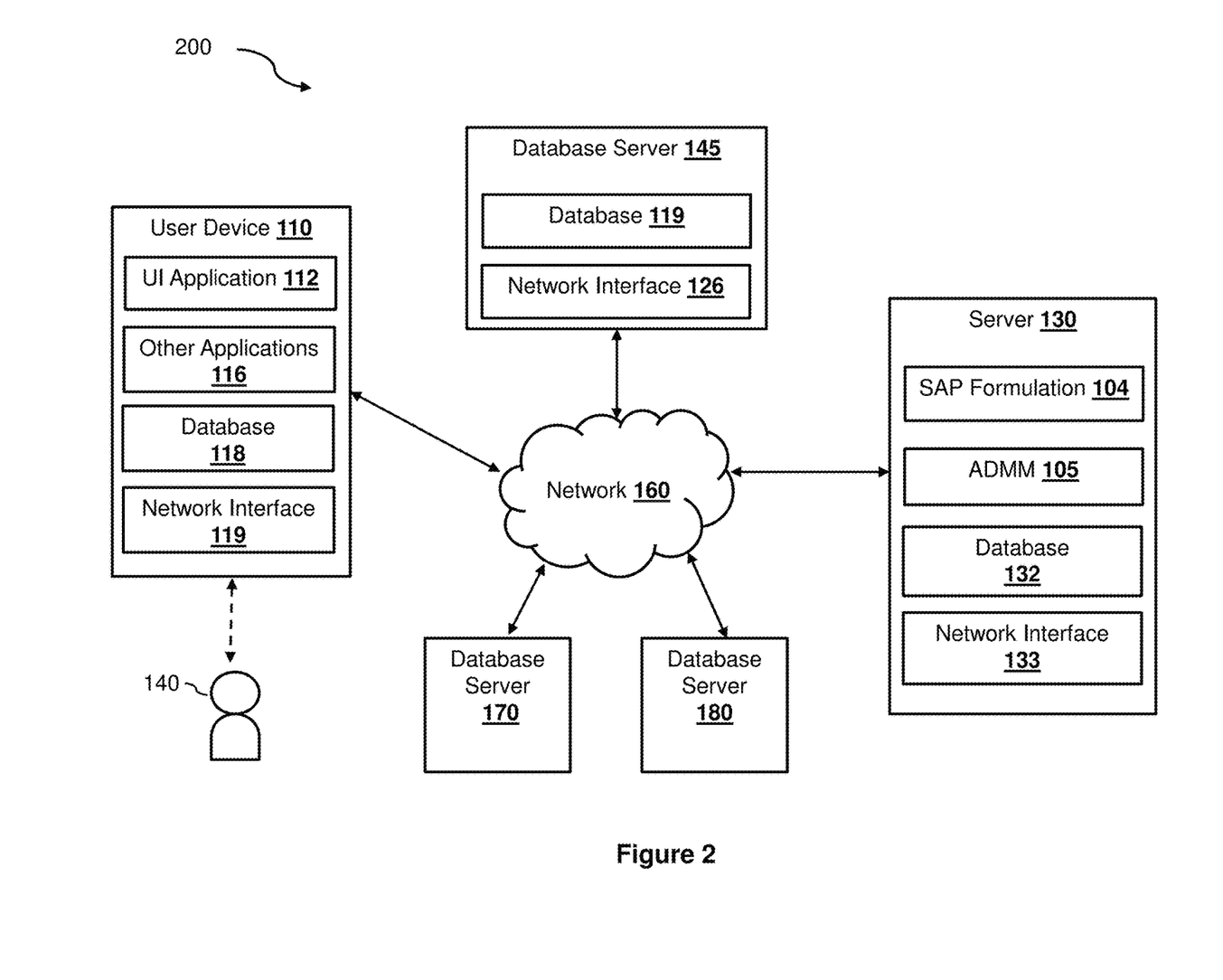
FIG. 2 is a block diagram of a networked system suitable for implementing the data flows described in FIG. 1 and other embodiments described herein, according to an embodiment.

FIG. 2 is a block diagram 200 of a networked system suitable for implementing the data flows described in FIG. 1 and other embodiments described herein, according to an embodiment. In one embodiment, block diagram 200 shows a system including the user device 110 which may be operated by a user 140, database servers 145, 170 and 180, server 130, and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

The user device 110, database servers 145, 170 and 180, and the server 130 may communicate with each other over a network 160. User device 110 may be utilized by a user 140 (e.g., an investor, an asset manager, etc.) to access the various functionality available for user device 110, which may include processes and/or applications associated with the server 130 to receive an output message containing the optimal control solution 106.

User device 110, database servers 145, 170, and 180, and the server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 may be implemented as a communication device that may utilize appropriate hardware and software configured for wired and/or wireless communication with database servers 145, 170, and 180, and/or the server 130. For example, in one embodiment, user device 110 may be implemented as a personal computer (PC), a smart phone, laptop/tablet computer, wristwatch with appropriate computer hardware resources, eyeglasses with appropriate computer hardware (e.g., GOOGLE GLASS@), other type of wearable computing device, implantable communication devices, and/or other types of computing devices capable of transmitting and/or receiving data, such as an IPAD® from APPLE®. Although only one communication device is shown, a plurality of communication devices may function similarly.

User device 110 contains a user interface (UI) application 112, and/or other applications 116, which may correspond to executable processes, procedures, and/or applications with associated hardware. For example, the user device 110 may receive a message indicating optimal control solution of the investment portfolio (e.g., 106 in FIG. 1) from the server 130 and display the message via the UI application 112. In other embodiments, user device 110 may include additional or different modules having specialized hardware and/or software as required.

In various embodiments, user device 110 includes other applications 116 as may be desired in particular embodiments to provide functions to user device 110. For example, other applications 116 may include security applications for implementing client-side security features, programmatic client applications for interfacing with appropriate application programming interfaces (APIs) over network 160, or other types of applications. Other applications 116 may also include communication applications, such as email, texting, voice, social networking, and IM applications that allow a user to send and receive emails, calls, texts, and other notifications through network 160. For example, the other application 116 may be an email or instant messaging application that receives a data message of optimal control policy 106 from the server 130. Other applications 116 may include device interfaces and other display modules that may receive input and/or output information. For example, other applications 116 may contain software programs for asset management, executable by a processor, including a graphical user interface (GUI) configured to provide an interface to the user 140 to view the performance of an investment portfolio or a trade order 115.

In one embodiment, the various applications 116 may cause different types of data traffic from the user device with the network 160, e.g., video streaming, instant messaging, email, web browsing, file transfer, and/or the like. Each application or type of traffic may be determined with an allocated bandwidth (resource) by server 130 to maximize the overall network utility.

User device 110 may further include database 118 stored in a transitory and/or non-transitory memory of user device 110, which may store various applications and data and be utilized during execution of various modules of user device 110. Database 118 may store user profile relating to the user 140, investment options previously elected by the user 140, portfolio reports previously received from the server 130, market data, and/or the like. In some embodiments, database 118 may be local to user device 110. However, in other embodiments, database 118 may be external to user device 110 and accessible by user device 110, including cloud storage systems and/or databases that are accessible over network 160.

User device 110 includes at least one network interface component 119 adapted to communicate with database servers 145, 170, 180, and/or the server 130. In various embodiments, network interface component 119 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Database server 145 may correspond to a server that hosts one or more of the databases 119$a$-$n$ (or collectively referred to as 119) to provide investment information to the server 130. For example, the database server 145 may be associated with a client such as an investor, an asset manage entity, and/or the like. The database 119 may be implemented by one or more relational database, distributed databases, cloud databases, and/or the like.

The database server 145 includes at least one network interface component 126 adapted to communicate with user device 110 and/or the server 130. In various embodiments, network interface component 126 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the database server 145 may send tax records of an investor corresponding to a portfolio retrieved from the database 119, via the network interface 126, to the server 130. Database servers 170 and 180 include similar components as database server 145.

The server 130 may be housed with the SAP formulation module 104 and the ADMM module 105 described in FIG. 1. In some implementations, modules 104-105 may receive investment information from database 119 at the database server 145 via the network 160 and implement an algorithm to generate an output message of investment control policy (e.g., 106 in FIG. 1). The solution may be used to adjust an investment portfolio, which is in turn used to generate a trade order reflecting the adjustment for an electronic trade platform for execution, as shown in FIG. 1. The trade order may also be generated by the user device 110, as shown in FIG. 1.

In another embodiment, in the context of network utility maximization, server 130 may be implemented as a centralized server, or a distributed server at a network gateway. The SAP formulation module 104 and the ADMM module 105 may be used to determine an optimal network resource allocation vector used for allocating bandwidths to different applications from the user device 110.

The database 132 may be stored in a transitory and/or non-transitory memory of the server 130. In various embodiments, for example, the database 132 may be a financial information database storing information relating to various assets, portfolio constituents, performance, market data, and/or the like. In one implementation, the database 132 may store data records obtained from the database servers 145, 170, and/or 180. In some embodiments, database 132 may be local to the server 130. However, in other embodiments, database 132 may be external to the server 130 and accessible by the server 130, including cloud storage systems and/or databases that are accessible over network 160.

The server 130 includes at least one network interface component 133 adapted to communicate with user device 110 and/or database servers 145, 170 or 180 over network 160. In various embodiments, network interface component 133 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

FIG. 3 is a simplified diagram 300 showing transforming an investment optimization problem into an alternating direction method of multipliers (ADMM) iterative method, according to an embodiment described herein. In one embodiment, the portfolio optimization problem 302 (e.g., Eq. (7)) may employ variables such as the holding variable h 301a, cash fraction variable c 301b and the factor exposure vector $\gamma$ 301c.

As discussed in relation to module 104 in FIG. 1, the portfolio optimization problem 302 (e.g., Eq. (7)) takes an equivalent form as an SAP optimization problem 303 (e.g., Eq. (5)). In particular, the SAP optimization problem 303 may be transformed to an equivalent ADMM-form 305, e.g., $$\text{minimize} \quad I_A(z) + \sum_{i=1}^n f_i(x_i) \quad (8)$$
$$\text{subject to} \quad x = z$$

with variables $x \in R^n$, and $z \in R^n$. Here $\xi_A$ is the indicator function over the affine constraints of Eq. (5), e.g., $$I_A(z) = \begin{cases} 0 & \text{if } Az = b \\ \infty & \text{otherwise.} \end{cases}$$

An augmented Lagrangian 306 is then computed from the ADMM formulation 305, e.g., $$L(x, z, \lambda) = f(x) + I_A(z) + \frac{1}{2}\|x - z + \lambda\|^2$$

where $\lambda$ is the dual variable. Based on the Lagrangian 306, the ADMM module 105 may perform ADMM iterations 307 to provide a solution to the optimization problem (8). For example, the ADMM iterations 307 iterate $x^k$, $z^k$, $\lambda^k$ for iteration steps k=0, 1, 2, . . . , $$x^{k+1} = \underset{x}{\text{argmin}} \, L(x, z^k, \lambda^k)$$
$$z^{k+1} = \underset{x}{\text{argmin}} \, L(x^{k+1}, z, \lambda^k)$$
$$\lambda^{k+1} = \lambda^k + x^{k+1} - z^{k+1}.$$

with initial values $z^0$ and $\lambda^0$.

In one embodiment, the ADMM iterations 307 may reach convergence 308 if $f$ is convex, e.g., when k→∞, $x^k$→$x^*$, $z^*$→$z^*$, $\lambda^k$→$\lambda^*$, where ($x^*$, $\lambda^*$) is the optimal-dual solution to the Eq. (5).

In one embodiment, when $f$ is non-convex, a termination criterion 309 may be applied to cease the ADMM iterations 307. For example, for any candidate point $x \in R^n$ satisfying Ax=b, a pseudo-objective and residual values may be defined as:

$$o(x) = f(\Pi_{dom(f)}(x))$$
$$r(x) = dist(x, dom(f))$$

At the current k-th iteration, a point x is determined which satisfying Ax=b. For example, this can be determined by taking the iterate value $x^k$ which satisfies $Ax^k$=b. The pseudo-objective o(x) and the residual values r(x) are computed. If $r(x) < \epsilon_r$ and $o(x) < o_{best}$, then the pre-defined value $o_{best}$ is updated with the current o(x). The ADMM iterations 307 may terminate if the best objective $o_{best}$ has not improved by more than a threshold $\epsilon_o$ in more than N iterations.

Figure 4:
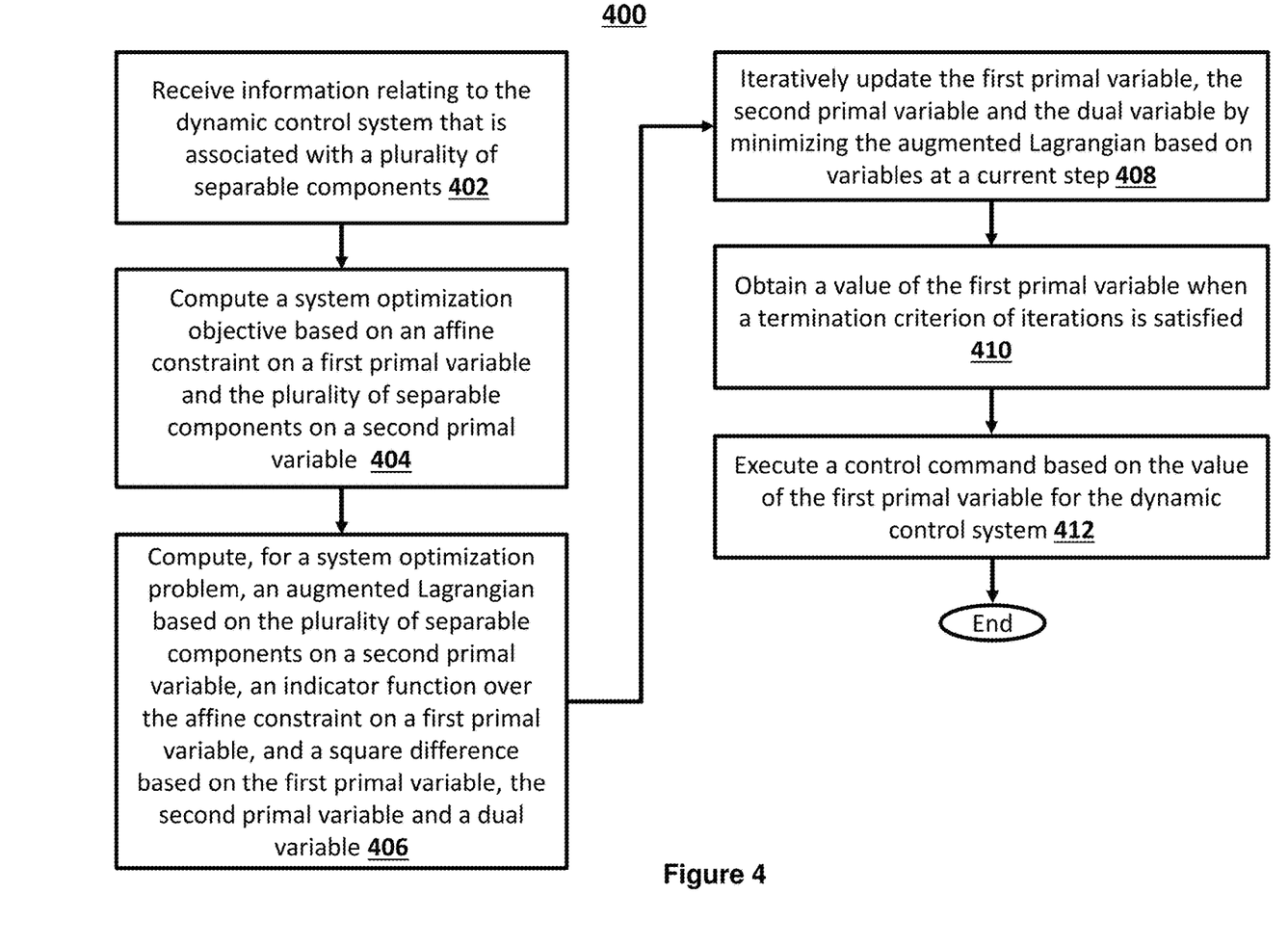
FIG. 4 is an example logic flow diagram illustrating an exemplary process for determining a control solution for an investment portfolio, according to an embodiment described herein.

FIG. 4 is an example logic flow diagram illustrating an exemplary process 400 for determining a control solution for an investment portfolio, according to an embodiment described herein. One or more of the processes of process 400 may be implemented, at least in part, in the form of executable code stored on non-transitory, tangible, machine-readable media that when run by one or more processors may cause the one or more processors to perform one or more of the processes. In some embodiments, process 400 may be performed by the SAP formulation module 104 and ADMM module 105 at server 130 in FIGS. 1-2. It is worth noting that additional processes, steps and/or implementations may be omitted, performed in a different sequence, or combined as desired or appropriate.

At step 402, information (e.g., system information 102a-n in FIG. 1) relating to the dynamic control system that is associated with a plurality of separable components may be received. For example, the dynamic control system may be a trading system, and the plurality of separable components include at least one of: a trade cost executing a trade based on the value of the first primal variable, a liability charge incurred by executing the trade, and a holding cost holding onto one or more assets. For another example, the dynamic control system may be a network resource allocation system implemented at a gateway of a network, and the plurality of separable components may be a set of end-user utilities such as power utility, bandwidth utility, latency, transmission error rate, and/or the like.

At step 404, a system optimization objective may be computed based on an affine constraint on a first primal variable and the plurality of separable components on a second primal variable. For example, the first primal variable is a cash fraction c, and the second primal variable is a factor exposure vector $\gamma$. For another example, the affine constraint may be computed as an indicator function that takes a value of zero when the affine constraint is satisfied, or a value of infinity when the affine constraint is not satisfied.

At step 406, for a system optimization problem, an augmented Lagrangian may be computed based on the plurality of separable components on a second primal variable, an indicator function over the affine constraint on a first primal variable, and a square difference based on the first primal variable, the second primal variable and a dual variable.

At step 408, the first primal variable, the second primal variable and the dual variable may be iteratively updated by minimizing the augmented Lagrangian based on variables at a current step.

At step 410, a value of the first primal variable may be obtained when a termination criterion of iterations is satisfied.

At step 412, a control command may be executed based on the value of the first primal variable for the dynamic control system. For example, at a network utility maximization component implemented on a network gateway, the gateway may then use the value of the first primal variable to allocate resource (e.g., bandwidth) to incoming traffic based on the types of the traffic, e.g., video streaming, web browsing, file transferring, point-to-point, instant messaging, and/or the like. Upon the allocation, the gateway may then determine a type of the incoming data traffic and allocate the corresponding resource to the data traffic based on the determined optimal allocation solution.

FIG. 5 is an example logic flow diagram illustrating an exemplary process for an iterative ADMM procedure 408 shown in FIG. 4 for determining the control solution, according to an embodiment described herein. One or more of the processes of process 408 may be implemented, at least in part, in the form of executable code stored on non-transitory, tangible, machine-readable media that when run by one or more processors may cause the one or more processors to perform one or more of the processes. In some embodiments, process 408 may be performed by the ADMM module 105 at server 130 in FIGS. 1-2. It is worth noting that additional processes, steps and/or implementations may be omitted, performed in a different sequence, or combined as desired or appropriate.

Process 408 may proceed from step 406 in FIG. 4. At step 503, an updated value of the first primal variable may be determined, which minimizes the augmented Lagrangian based on fixed values of the second primal variable and the dual variable at the current step. For example, the first primal variable x may be updated as:

$$x^{k+1} = \operatorname*{argmin}_x f(x) + \frac{1}{2}\|x - z^k + \lambda^k\|^2$$

Because $f$ is separable, this update may be performed by solving n univariate optimization problems. The update for each component $x_i$ is given by:

$$x_i^{k+1} = \operatorname*{argmin}_x f_i(x_i) + \frac{1}{2}(x_i - z_i^k + \lambda_i)^2$$

which may be expressed using a proximal operator as:

$$x_i^{k+1} = \operatorname{prox}_{f_i}(z_i^k - \lambda_i^k)$$

For example, when $f_i$ is piecewise quadratic, denoted by $\varphi$ with k pieces, defined as:

$$\varphi(x) = \begin{cases} P_1 x^2 + q_1 x + T_1 & \text{if } x \in [a_1, b_1] \\ \vdots & \vdots \\ P_k x^2 + q_k x + r_k & \text{if } x \in [a_k, b_k] \\ +\infty & \text{otherwise} \end{cases}$$

with $\alpha_1 \le b_1 \le \alpha_2 \le \ldots \le \alpha_k \le b_k$. The ith piece of $\varphi$ is denoted as:

$$\varphi_i(x) = \begin{cases} p_i x^2 + q_i x + r_i & \text{if } x \in [a_i, b_i] \\ +\infty & \text{otherwise.} \end{cases}$$

Then the proximal operator of $\varphi$ may be computed as:

$$\operatorname{prox}_\varphi(u) = \operatorname*{argmin}_x \left(\varphi(x) + \frac{1}{2}(x - u)^2\right)$$

To compute the proximal operator, first, the piecewise quadratic function $$\frac{\varphi(x) + (x - u)^2}{2},$$

which is done by adding $1=2, -u$, and $u^2/2$ to the coefficients $p_i$, $q_i$, and $r_i$, for all i. Computing the minimizer of this function can be done by computing the minimum value of each piece, taking the minimum over these values, and then finding a value of x that attains this minimum. Therefore, if $\varphi$ is convex, its proximal operator is computed as:

$$\operatorname{prox}_\varphi(u) =$$

$$\begin{cases} a_1 & \text{if } u \in (-\infty, (2p_1 + 1)a_1 + q_1] \\ (u - q_1)/(1 + 2p_1) & \text{if } u \in [(2p_1 + 1)a_1 + q_1, (2p_1 + 1)b_1 + q_1] \\ \vdots & \vdots \\ a_j & \text{if } u \in [(2p_{j-1} + 1)b_{j-1} + q_{j-1}, (2p_1 + 1)a_j + q_j] \\ (u - q_j)/(1 + 2p_j) & \text{if } u \in [(2p_j + 1)a_j + q_j, (2p_j + 1)b_j + q_j] \\ \vdots & \vdots \\ a_k & \text{if } u \in [(2p_{k-1} + 1)b_{k-1} + q_{k-1}, (2p_k + 1)a_k + q_k] \\ (u - q_k)/(1 + 2p_k) & \text{if } u \in [(2p_k + 1)a_k + q_k, (2p_k + 1)b_k + q_k] \\ b_k & \text{if } u \in [(2p_k + 1)b_k + q_k, \infty). \end{cases}$$

At step 504, an updated value of the second primal variable may be determined, which minimizes augmented Lagrangian based on the updated value of the first primal variable and a fixed value of the dual variable from the current step. For example, minimizing the augmented Lagrangian may involve solving the following equality-constrained least-squares problem:

$$\begin{aligned} \text{minimize} \quad & \|z - x^{K+1} + \lambda^k\|^2 \\ \text{subject to} \quad & Az = b \end{aligned}$$

with variable z. The minimizing z (which becomes $z^{k+1}$) is then determined by solving the following linear system of equations:

$$\begin{bmatrix} I & A^T \\ A & 0 \end{bmatrix} \begin{bmatrix} z^{k+1} \\ v \end{bmatrix} = \begin{bmatrix} x^k - \lambda^k \\ b \end{bmatrix}$$

The matrix on the left hand side may be factorized before the first iteration, and caching it for repeated use to improve computational efficiency.

At step 505, an updated value of the dual variable may be determined by adding a difference between the updated values of the first primal variable and the second primal variable.

Upon competing steps 503-505 in the current iteration, process 408 may determine whether termination criteria (e.g., 309 in FIG. 3) are satisfied. If the termination criteria are not met, process 408 proceeds to the next iteration at step 512, which repeats from step 503. Otherwise, if the termination criteria are met, process 408 proceeds to step 410 in FIG. 4.

Figure 6:
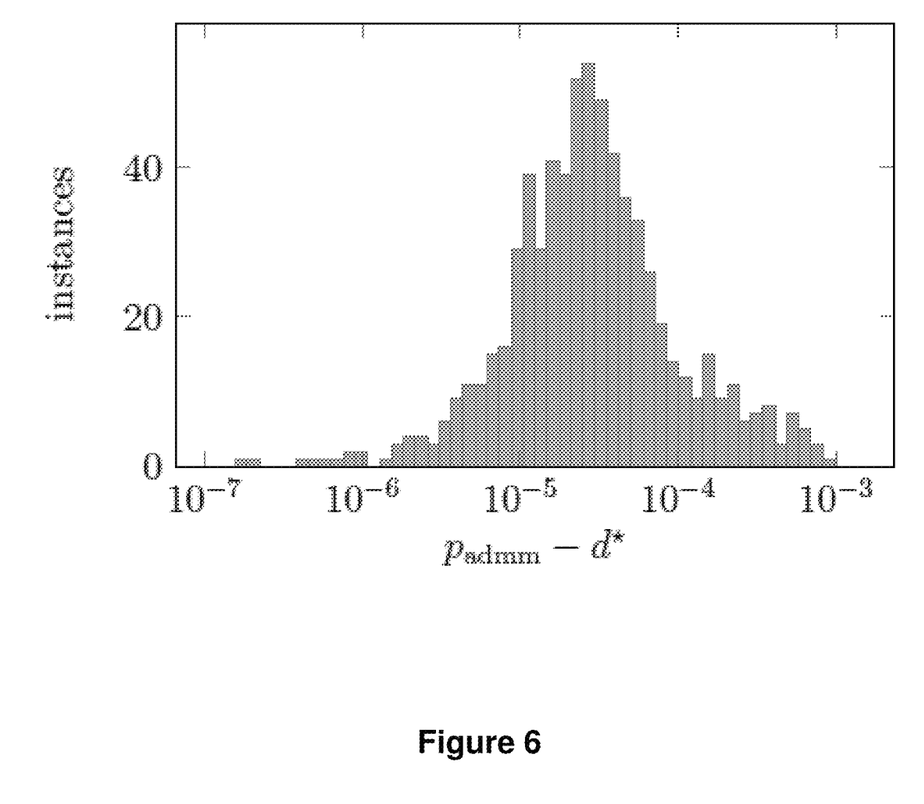
FIG. 6 is an example data plot diagram illustrating a suboptimality gap between using the ADMM procedure and the global optimum, according to an embodiment described herein.
Figure 7:
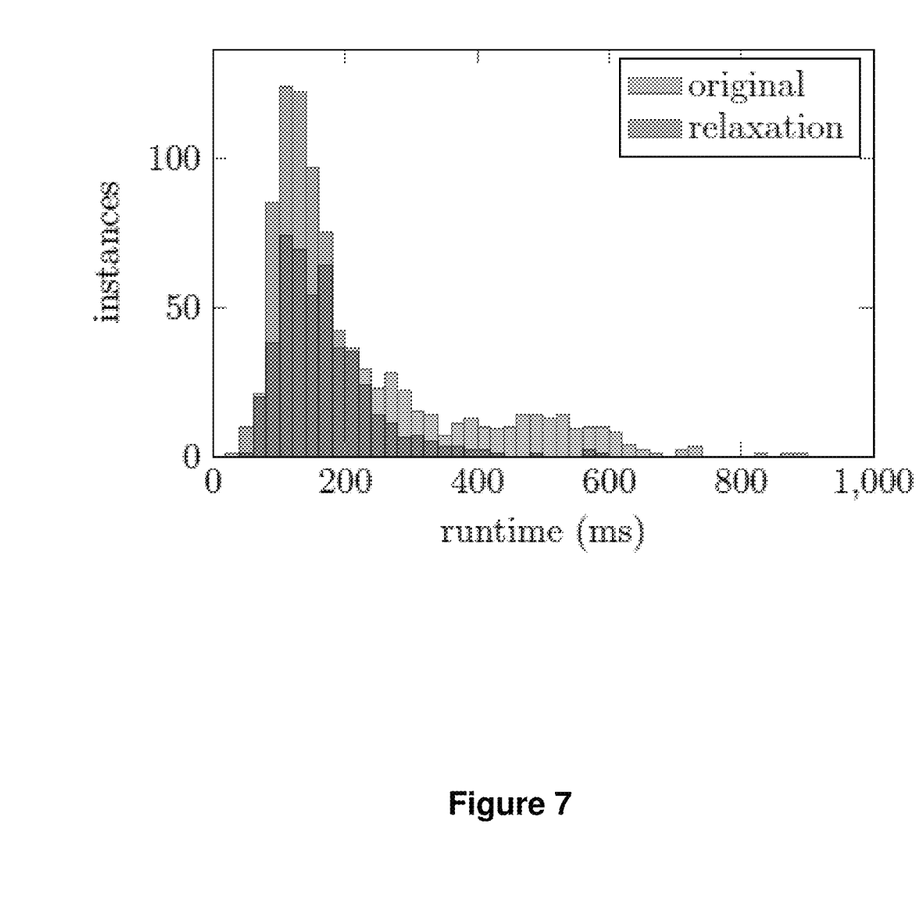
FIG. 7 is an example data plot diagram illustrating runtime distribution of the ADMM procedure applied to the original problem and a relaxed problem, according to an embodiment described herein.

FIGS. 6-7 illustrate results of an example of the method applied to a tax-aware portfolio optimization with small account sizes. For example, the trading cost combines the bid{ask spread model with a penalty on the number of trades and capital gain:

$$\phi_{trd}(u) = \gamma_{sprd} s^T |u| + c_{trd} \mathrm{card}(u) + \gamma_{tax} L(u)$$

Using a lower bound $h_{lb}=0$, which encodes a long-only constraint, and the upper bound for security i is $h_{ub,i} = \max\{3h_{b,i}, h_{init,i}\}$, i.e., it is the greater of the current holdings and 3 times the benchmark weight. The combined holding cost is:

$$\phi_{hld}(h) = \begin{cases} c_{hld}\mathrm{card}(h) & \text{if } 0 \le h \le h_{ub} \\ \infty & \text{otherwise.} \end{cases}$$

Given the above setup, when solving the original portfolio optimization problem (1), parameters are set as: $\gamma_{risk}=100$, $c_{hld}=c_{trd}=3\times10^{-5}$, and $\gamma_{tax}=1$. The parameters $\gamma_{trd}$ and $\gamma_{hld}$ are redundant and were set to 1. With these values, the portfolio maintains active risk around 0.5%-1%, holds only 200-300 securities of the S % P 500, and typically trades around 30 securities per month. The invested fraction is maintained between $\eta_{lb}=0.98$ and $\eta_{ub}=0.99$. In the ADMM iterations, parameters are set as $\epsilon_r=3\times10^{-4}$ and $\epsilon_0=10^{-5}$. Termination conditions are verified once every 10 steps and terminate if the objective have not improved in more than N=50 iterations.

Using the parameters described above, 692 instances of the portfolio optimization problems problem 302 (Eq. (1)) are generated. The mean optimal utility U* across these problems ranged from −1028 to 184 basis points, with a mean and standard deviation of 94 basis points and 57 basis points, respectively.

To evaluate the ADMM iterations, the objective values obtained by ADMM on the 692 problem instances, denoted by $p_{admm}$, to the lower bounds d* obtained by solving a convex relaxation:

$$\text{minimize } \sum_{i=1}^{n} f_i^{**}(x_i)$$
$$\text{subject to } Ax = b,$$

where $f^{**}$ is the convex envelope of a non-convex $f$. The optimal problem value p*lies between these values:

$$d^* \le p^* \le p_{admm}.$$

FIG. 6 is an example data plot diagram illustrating a suboptimality gap $p_{admm}$-d* between using the ADMM procedure and the global optimum, according to an embodiment described herein. These range from 0 to 10 basis points, with mean 0:6 basis points and standard deviation 1:1 basis points. These values are quite small compared to the problems values p*, which range from −1028 to 184 basis points. This implies that the ADMM heuristic produces nearly optimal points on all 692 problem instances.

FIG. 7 is an example data plot diagram illustrating runtime distribution of the ADMM procedure applied to the original problem and a relaxed problem, according to an embodiment described herein. In addition to being accurate, ADMM was also fast. It solved the original (nonconvex) problems in an average of 251 ms (std. 159 ms), and solved the relaxed (convex) in an average of 152 ms (std. 67 ms). FIG. 7 shows the distributions of runtimes for original and relaxed problems.

Figure 8:
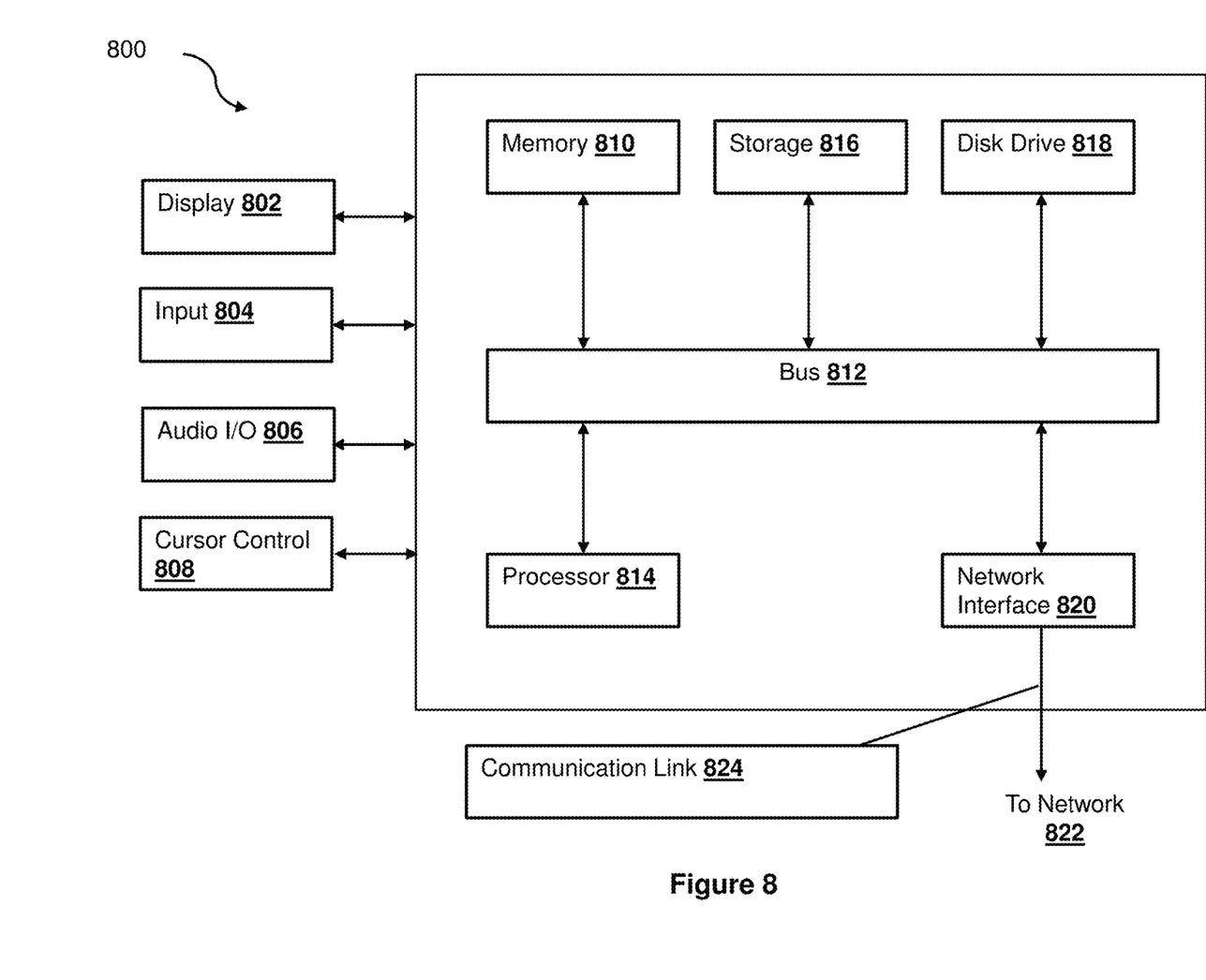
FIG. 8 is a block diagram of a computer system suitable for implementing one or more components shown in FIGS. 1-2 and performing one or more processes shown in FIG. 3-5, according to an embodiment.

FIG. 8 is a block diagram of a computer system 800 suitable for implementing one or more components shown in FIGS. 1 and 2 and performing one or more processes shown in FIGS. 4 and 5, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for allocating resources to a plurality of user devices in a dynamic control network system as linearly constrained separable optimization, the method comprising;

receiving, at a network gateway, information relating to the dynamic control network system having a plurality of user devices corresponding to a plurality of application traffic types that are associated with a plurality of end-user utilities in a form of a plurality of separable components;

computing a network utility objective, subject to an affine constraint on a first primal variable indicating a network resource application vector, including the plurality of separable components on a second primal variable equivalent to the first primal variable;

computing, for a system optimization problem, an augmented network utility objective based on the plurality of separable components on the second primal variable, an indicator function over the affine constraint on the first primal variable, and a square difference based on the first primal variable, the second primal variable and a dual variable;

iteratively updating the first primal variable, the second primal variable and the dual variable by minimizing the augmented network utility objective based on variables at a current step;

obtaining resource allocation values for the plurality of user device corresponding to a plurality of application traffic types from the first primal variable when a termination criterion of iterations is satisfied;

receiving, at the network gateway, an incoming network traffic; and allocating, at the network gateway, network bandwidths for transmitting the incoming network traffic depending on an application type of the incoming network traffic and the obtained resource allocation values for the plurality of application traffic types.

2. The method of claim 1, wherein the dynamic control network system is a trading system, and the plurality of separable components include at least one of:
a trade cost executing a trade based on the value of the first primal variable,
a liability charge incurred by executing the trade, or
a holding cost for holding onto one or more assets.

3. The method of claim 2, wherein the first primal variable is a cash fraction, and the second primal variable is a factor exposure vector.

4. The method of claim 1, wherein the affine constraint is computed as an indicator function that takes a value of zero when the affine constraint is satisfied, or a value of infinity when the affine constraint is not satisfied.

5. The method of claim 1, wherein the iteratively updating comprises:
determining an updated value of the first primal variable that minimizes the augmented Lagrangian based on fixed values of the second primal variable and the dual variable at the current step;
determining an updated value of the second primal variable that minimizes the augmented Lagrangian based on the updated value of the first primal variable and a fixed value of the dual variable from the current step; and
determining an updated value of the dual variable by adding a difference between the updated values of the first primal variable and the second primal variable.

6. The method of claim 5, wherein the iteratively updating further comprises:
factorizing a matrix associated with a linear system for minimizing the augmented Lagrangian; and
caching the factorized matrix at a first iteration that enables repeated uses in later iterations.

7. The method of claim 5, wherein the updated value of the first primal variable is determined using a proximal operator between the second primal variable and the dual variable based on a separable objective function of the system optimization objective.

8. The method of claim 1, wherein the iteratively updating is initialized with values of the first primal variable, the second primal variable and the dual variable from solving a relaxed system optimization problem.

9. The method of claim 1, wherein the termination criterion of iterations includes a convergence of the first primal variable, the second primal variable and the dual variable to a respective equilibrium when the system optimization objective is a convex function.

10. The method of claim 1, wherein determining when the termination criterion of iterations is satisfied comprises:
computing a pseudo-objective value on a current value of the first primal variable; and
determining whether the pseudo-objective value has improved by at least a threshold value for a pre-defined number of iterations.

11. A system for allocating resources to a plurality of user devices in a dynamic control network system as linearly constrained separable optimization, the system comprising:
a communication interface configured to receive at a network gateway, information relating to the dynamic control network system having a plurality of user devices corresponding to a plurality of application traffic types that are associated with a plurality of end-user utilities in a form of a plurality of separable components;
a memory storing a plurality of processor-executable instructions; and
a processor reading from the memory and executing the plurality of processor-executable instructions to perform operations comprising:
computing a network utility objective, subject to an affine constraint on a first primal variable indicating a network resource application vector, including the plurality of separable components on a second primal variable equivalent to the first primal variable;
computing, for a system optimization problem, an augmented network utility objective based on the plurality of separable components on the second primal variable, an indicator function over the affine constraint on the first primal variable, and a square difference based on the first primal variable, the second primal variable and a dual variable;
iteratively updating the first primal variable, the second primal variable and the dual variable by minimizing the augmented network utility objective based on variables at a current step;
obtaining resource allocation values for the plurality of user device corresponding to a plurality of application traffic types from the first primal variable when a termination criterion of iterations is satisfied;
receiving, at the network gateway, an incoming network traffic; and
allocating, at the network gateway, network bandwidths for transmitting the incoming network traffic depending on an application type of the incoming network traffic and the obtained resource allocation values for the plurality of application traffic types.

12. The system of claim 11, wherein the dynamic control network system is a trading system, and the plurality of separable components include at least one of:
a trade cost executing a trade based on the value of the first primal variable,
a liability charge incurred by executing the trade, or
a holding cost holding onto one or more assets.

13. The system of claim 12, wherein the first primal variable is a cash fraction, and the second primal variable is a factor exposure vector.

14. The system of claim 11, wherein the affine constraint is computed as an indicator function that takes a value of zero when the affine constraint is satisfied, or a value of infinity when the affine constraint is not satisfied.

15. The system of claim 11, wherein the updating comprises:
determining an updated value of the first primal variable that minimizes the augmented Lagrangian based on fixed values of the second primal variable and the dual variable at the current step;
determining an updated value of the second primal variable that minimizes augmented Lagrangian based on the updated value of the first primal variable and a fixed value of the dual variable from the current step; and
determining an updated value of the dual variable by adding a difference between the updated values of the first primal variable and the second primal variable.

16. The system of claim 15, wherein updating further comprises:
factorizing a matrix associated with a linear system for minimizing the augmented Lagrangian; and
caching the factorized matrix.

17. The system of claim 15, wherein the updated value of the first primal variable is determined using a proximal operator between the second primal variable and the dual variable based on a separable objective function of the system optimization objective.

18. The system of claim 11, wherein the termination criterion of iterations includes a convergence of the first primal variable, the second primal variable and the dual variable to a respective equilibrium when the system optimization objective is a convex function.

19. The system of claim 11, wherein the determining comprises:
   computing a pseudo-objective value on a current value of the first primal variable; and
   determining whether the pseudo-objective value has improved by at least a threshold value for a pre-defined number of iterations.

20. A non-transitory processor-readable storage medium storing a plurality of processor-executable instructions for allocating resources to a plurality of user devices in a dynamic control network system as linearly constrained separable optimization, the instructions being executed by a processor to perform operations comprising;
   receiving, at a network gateway, information relating to the dynamic control network system having a plurality of user devices corresponding to a plurality of application traffic types that are associated with a plurality of end-user utilities in a form of a plurality of separable components a plurality of separable components;
   computing a network utility objective, subject to an affine constraint on a first primal variable indicating a network resource application vector, including the plurality of separable components on a second primal variable equivalent to the first primal variable;
   computing, for a system optimization problem, an augmented network utility objective based on the plurality of separable components on the second primal variable, an indicator function over the affine constraint on the first primal variable, and a square difference based on the first primal variable, the second primal variable and a dual variable;
   iteratively updating the first primal variable, the second primal variable and the dual variable by minimizing the augmented network utility objective based on variables at a current step;
   obtaining resource allocation values for the plurality of user device corresponding to a plurality of application traffic types from the first primal variable when a termination criterion of iterations is satisfied;
   receiving, at the network gateway, an incoming network traffic; and
   allocating, at the network gateway, network bandwidths for transmitting the incoming network traffic depending on an application type of the incoming network traffic and the obtained resource allocation values for the plurality of application traffic types.

\* \* \* \* \*